(12) United States Patent
Ko et al.

(10) Patent No.: US 9,372,290 B2
(45) Date of Patent: Jun. 21, 2016

(54) SPECTRUM ANALYZER AND REFLECTION TYPE DIFFRACTION GRATING THEREOF

(76) Inventors: Cheng-Hao Ko, Zhudong Township, Hsinchu County (TW); Yung-Chuan Wu, Hsinchu (TW)

( * ) Notice: Subject to any disclaimer, the term of this patent is extended or adjusted under 35 U.S.C. 154(b) by 695 days.

(21) Appl. No.: 13/696,613

(22) PCT Filed: May 7, 2010
(Under 37 CFR 1.47)

(86) PCT No.: PCT/CN2010/072515
§ 371 (c)(1),
(2), (4) Date: Mar. 14, 2013

(87) PCT Pub. No.: WO2011/137592
PCT Pub. Date: Nov. 10, 2011

(65) Prior Publication Data
US 2013/0293961 A1    Nov. 7, 2013

(51) Int. Cl.
  G02B 5/18 (2006.01)
  G01J 3/02 (2006.01)
  G01J 3/18 (2006.01)
(52) U.S. Cl.
  CPC ............. *G02B 5/1861* (2013.01); *G01J 3/0256* (2013.01); *G01J 3/0262* (2013.01); *G01J 3/18* (2013.01); *G01J 2003/1847* (2013.01)
(58) Field of Classification Search
  None
  See application file for complete search history.

(56) References Cited

U.S. PATENT DOCUMENTS

| | | | |
|---|---|---|---|
| 4,776,696 A * | 10/1988 | Hettrick et al. | 356/328 |
| 4,798,446 A | 1/1989 | Hettrick | |
| 5,371,586 A | 12/1994 | Chau | |
| 5,493,393 A * | 2/1996 | Beranek | G01D 5/34776 356/328 |
| 6,825,988 B2 * | 11/2004 | Bristol | 359/634 |
| 7,034,935 B1 | 4/2006 | Krizelecky | |
| 7,623,235 B2 | 11/2009 | Ho et al. | |
| 2003/0197862 A1 * | 10/2003 | Cohen | G02B 6/12007 356/328 |
| 2008/0117341 A1 | 5/2008 | McGrew | |

FOREIGN PATENT DOCUMENTS

| | | | |
|---|---|---|---|
| CN | 101295050 A | 10/2008 | |
| CN | 101382666 A | 3/2009 | |
| WO | WO 2011120234 A1 * | 10/2011 | ............ G01J 3/0256 |
| WO | WO 2011137584 A1 * | 11/2011 | ................ G01J 3/02 |

OTHER PUBLICATIONS

International Search Report for PCT/CN2010/072515, Feb. 17, 2011.

\* cited by examiner

*Primary Examiner* — Arnel C Lavarias

(57) ABSTRACT

A spectrum analyzer includes an input member, a predetermined output plane and a reflection type diffraction grating. The input member receives an optical signal. The reflection type diffraction grating includes a non-Rowland circle curved grating profile curved surface and a plurality of diffraction structures. The diffraction structures, each having a pitch and disposed on the grating profile curved surface, are configured to separate the optical signal into a plurality of spectral components. At least some pitches of the spectral components are different from each other. One of the spectral components indicating a central wavelength is emitted to the predetermined output plane in a direction substantially perpendicular to the predetermined output plane. The grating profile curved surface is used for focusing the spectral components on the predetermined output plane.

11 Claims, 11 Drawing Sheets

SPECTRUM ANALYZER AND REFLECTION TYPE DIFFRACTION GRATING THEREOF

This application is the 35 U.S.C. §371 national stage of PCT application PCT/CN2010/072515, filed May 7, 2010, the disclosure of which is hereby incorporated by reference.

BACKGROUND OF THE INVENTION

1. Field of the Invention

The invention relates in general to an optical system, and more particularly to an optical system with reflection type diffraction grating.

2. Description of the Related Art

There are many different ways to decompose or separate the composition of a substance to understand its ingredients such as the composition of or the compounds in water. The process of decomposition and separation employed in above test are all destructive, and normally necessary testing processes are conducted in response to the needs. In contrast, the spectrum analyzer is a non-destructive testing instrument, which recognizes the ingredients and the properties of a substance according to atomic or molecular energy levels and chemical bonds of the substance. According to the reflection theory of the light, the compositional structures of substances are different from each other in terms of reflection, absorption and penetration for the light with different frequency bands, and different substances have their respective spectrum arranged according to the wavelength.

Referring to FIG. 1, a conventional spectrum analyzer is shown. After the light 900 generated by the light source 810 is emitted to the spectrum analyzer 800 via the slit 820, the light 900 is emitted to a collimating mirror 830 in free space and is converted to a parallel light which is then emitted to a plane grating 840. The light being divided by the diffraction structure 842 of the grating 840 is then focused by the focusing mirror 850 and emitted to the optical detector 860 to detect the intensity of the light with different wavelengths to generate a corresponding image. However, the conventional spectrum analyzer uses a plane grating, which requires the use of a collimating mirror and a focusing mirror for accurately dividing and focusing the light. Since the process of precisely aligning the optical components is very complicated and the number of components is large, minor vibrations may cause the alignment of the optical components to shift and incur more manufacturing and maintenance costs, not only creating inconvenience of use but also jeopardizing the object of miniaturizing the spectrum analyzer and achieving portability.

SUMMARY OF THE INVENTION

The invention is directed to an optical system which comprises an input member, a predetermined output plane and a reflection type diffraction grating. The input member receives an optical signal. The reflection type diffraction grating comprises a grating profile curved surface and a plurality of diffraction structures. The diffraction structures, which separate the optical signal into a plurality of spectral components, are respectively disposed on the grating profile curved surface by a plurality of pitches. At least some pitches are different from each other. Based on actual optical simulation, the reflection type diffraction grating designed according to the above principles makes the spectral components emitted to the predetermined output plane in a direction substantially perpendicular to the predetermined output plane. The grating profile curved surface is used for focusing the spectral components on the predetermined output plane.

The invention is directed to a reflection type diffraction grating which comprises a grating profile curved surface and a plurality of diffraction structures. The diffraction structures, which separate the optical signal into a plurality of spectral components, are respectively disposed on the grating profile curved surface by a plurality of pitches. Based on actual optical simulation, the reflection type diffraction grating designed according to the above principles makes the spectral components emitted to the predetermined output plane in a direction substantially perpendicular to the predetermined output plane. The grating profile curved surface is used for focusing the spectral components on the predetermined output plane.

The condition "substantially perpendicular" refers to the central wavelength in a plurality of spectral components. Provided that the condition "substantially perpendicular" is satisfied, the spectral component indicating the central wavelength is emitted to the predetermined output plane in a direction perpendicular to the predetermined output plane, and the remaining spectral components have a preferred aberration induced spectral resolution smaller than a predetermined value when focused on the predetermined output plane. According to the generally known "Rowland Circle Theory", light diffracted by a grating with fixed pitches formed on an arced grating profile curved surface has a part of Rowland circle will be focused on an arced surface of the Rowland circle rather than an arbitrary predetermined output plane which is easy to implement. Namely, unless the output plane and its curvature align with Rowland circle, it is almost impossible to make the diffracted light orthogonal or near-orthogonal to the focusing arc tangent line. Based on the Rowland circle theory, for the diffracted light to be substantially perpendicular to a predetermined output plane, the design requirements of the grating must be more flexible, that is, the pitch does not have to be fixed, and the grating profile curved surface does not have to be arced. Through optical simulation, non-fixed pitches and a grating profile surface with non-arced surface are obtained for enabling the diffracted light to be emitted to the predetermined output plane in a direction substantially perpendicular to the predetermined output plane. Thus, better diffraction efficiency is achieved, the predetermined output plane does not have to be an arc on a Rowland circle which is difficult to implement, and can be an easy-to-implement output surface such as a straight line on a plane. A diffraction grating implemented in the above manner is highly valuable.

The above and other aspects of the invention will become better understood with regard to the following detailed description of the preferred but non-limiting embodiment(s). The following description is made with reference to the accompanying drawings.

DETAILED DESCRIPTION OF THE INVENTION

The following embodiments relate to an optical system and a reflection type diffraction grating thereof. The optical system comprises an input member, a predetermined output plane and a reflection type diffraction grating. The input member receives an optical signal. The reflection type diffraction grating comprises a grating profile curved surface and a plurality of diffraction structures which separate the optical signal into a plurality of spectral components. The diffraction structures are respectively disposed on the grating profile curved surface by a plurality of pitches. At least some pitches are different from each other, so that the spectral components are emitted to the predetermined output plane in a direction substantially perpendicular to the predetermined output plane. The grating profile curved surface is used for focusing the spectral components on the predetermined output plane. The condition "substantially perpendicular" refers to the central wavelength of a plurality of spectral components, so that the spectral components at the central wavelength are emitted to the predetermined output plane in a direction perpendicular to the predetermined output plane, and the remaining spectral components have a preferred aberration induced spectral resolution smaller than a predetermined value when focused on the predetermined output plane.

Figure 2:
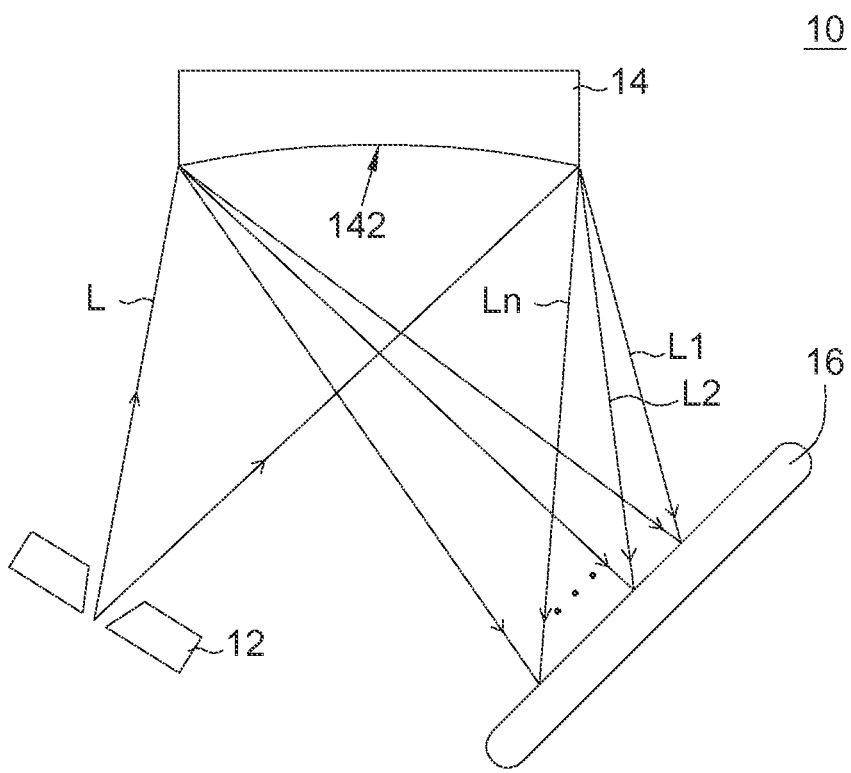
FIG. 2 shows a schematic diagram of an optical system according to an embodiment of the invention.
Figure 3:
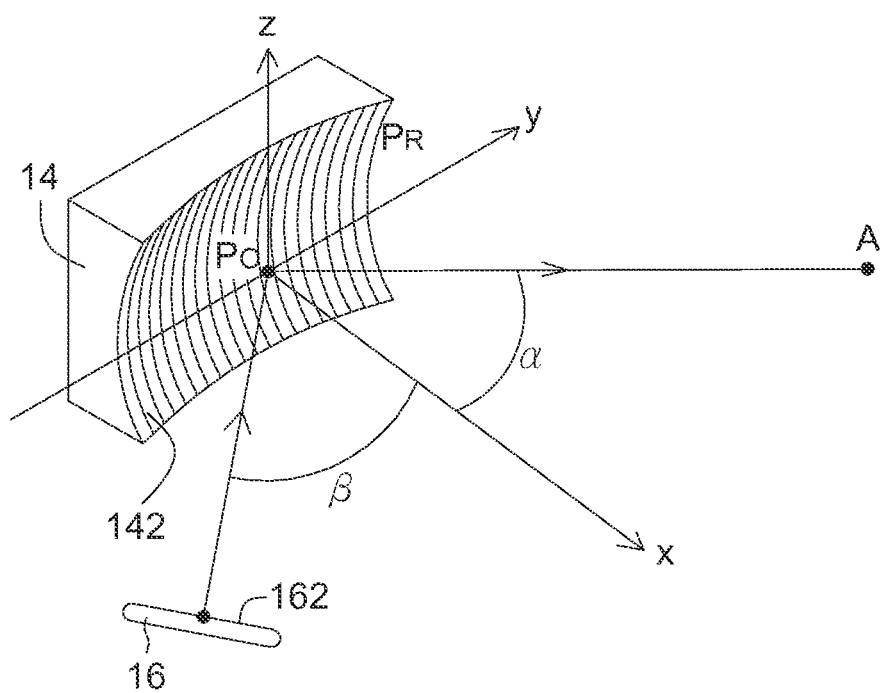
FIG. 3 shows a schematic diagram of diffraction theory.
Figure 4:
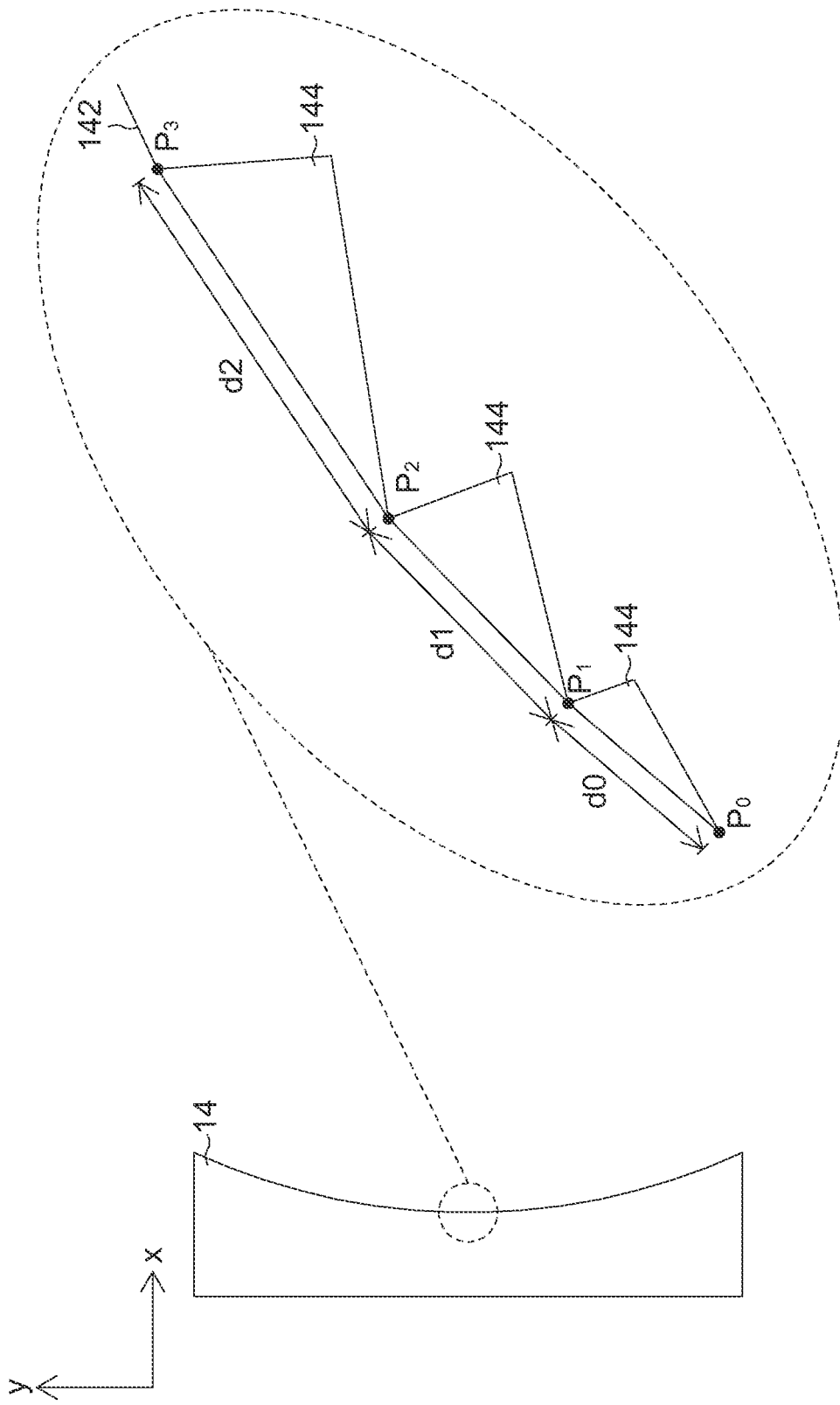
FIG. 4 shows a reflection type diffraction grating according to an embodiment of the invention.

Referring to FIG. 2, FIG. 3 and FIG. 4 at the same time. FIG. 2 shows a schematic diagram of an optical system according to an embodiment of the invention. FIG. 3 shows a schematic diagram of diffraction theory. FIG. 4 shows a reflection type diffraction grating according to an embodiment of the invention. The optical system 10, such as a spectrum analyzer, comprises an input member 12, a reflection type diffraction grating 14 and an optical detector 16. The input member 12, such as a slit or an optical fiber terminal, receives an optical signal L. The optical detector 16 comprises a predetermined output plane 162, which is the connected line of the predetermined focal points of the diffracted light with various wavelengths, not a physical object. The predetermined output plane 162 is a straight line on a plane such as the optical image reception plane of a charge couple device (CCD) or a complementary metal-oxide-semiconductor (CMOS).

The reflection type diffraction grating 14 comprises a grating profile curved surface 142 and a plurality of diffraction structures 144. The diffraction structures 144 separate the optical signal L into spectral components L1~Ln, and the number of spectral components is at least greater than 3. The spectral components L1~Ln respectively comprise all the light within a particular wavelength range, which is determined according to the resolution of the optical system 10. For example, if the resolution of the optical system 10 is 1.5 nanometers, then the spectral component L1 comprises all the light within a wavelength range between 1.5 nanometers, such as the wavelength range between 400~401.5 nanometers. Similarly, the spectral component L2 comprises all the light within a wavelength range between 401.5~403 nanometers, and the remaining spectral components L3~Ln can be obtained in the same manner. The full width at half maximum (FWHM) resolution of the spectral components L1~Ln displayed on the predetermined output plane 162 is smaller than a predetermined value. The diffraction structures 144 are not limited to a particular shape, and can be such as triangular, circular, oval or squared. For convenience of elaboration, the diffraction structures 144 of FIG. 4 are similar triangles. The diffraction structures 144 are respectively disposed on the grating profile curved surface 142 by a plurality of pitches. At least some pitches are different from each other, so that the spectral components L1~Ln are emitted to the predetermined output plane 162 in a direction substantially perpendicular to the predetermined output plane 162. The number of the pitches being different from each other can be adjusted according to the needs of the design. For convenience of elaboration, three different pitches d0~d2 are illustrated in FIG. 4.

The grating profile curved surface 142 is used for focusing the spectral components on L1~Ln on the predetermined output plane 162. The grating profile curved surface 142 further comprises a plurality of profile points. For convenience of elaboration, only three profile points $P_0$~$P_3$ are illustrated in FIG. 4. The determination of the positions of the profile points on the grating profile curved surface 142 for enabling the spectral components L1~Ln to be emitted to the predetermined output plane 162 in a direction substantially perpendicular to the predetermined output plane 162 is disclosed below. The pitches d0~d2 are respectively the lengths of the segments formed by the profile points $P_0$~$P_1$, $P_1$~$P_2$ and $P_2$~$P_3$.

The reflection type diffraction grating 14 of the invention comprises a grating profile curved surface and a plurality of diffraction structures, and has dividing and focusing functions accordingly. Thus, the reflection type diffraction grating 14 can replace the collimating mirror and the focusing mirror of a conventional optical system, so as to reduce the number of components used in the optical system 10 as well as the complicated alignment problem. In addition, the spectral components L1~Ln are substantially and orthogonally emitted to the predetermined output plane 16, so that preferred optical detection quality can be achieved.

Figure 5:
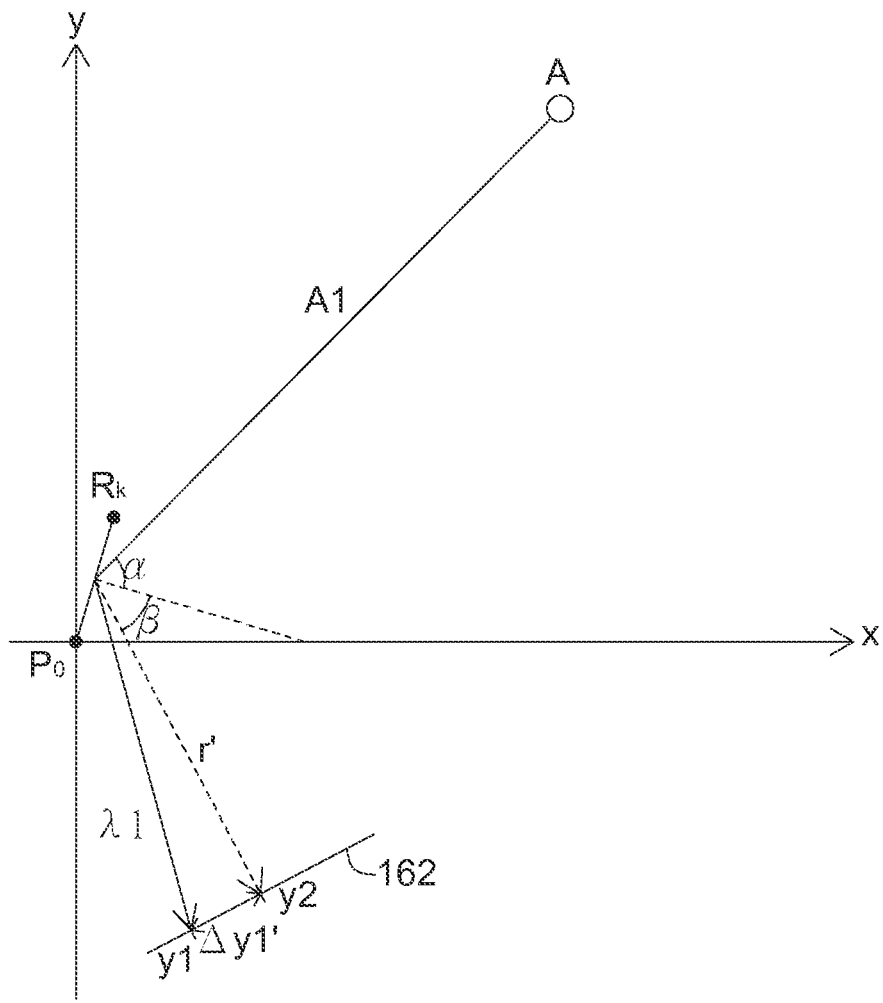
FIG. 5 shows a schematic diagram of aberration.
Figure 6:
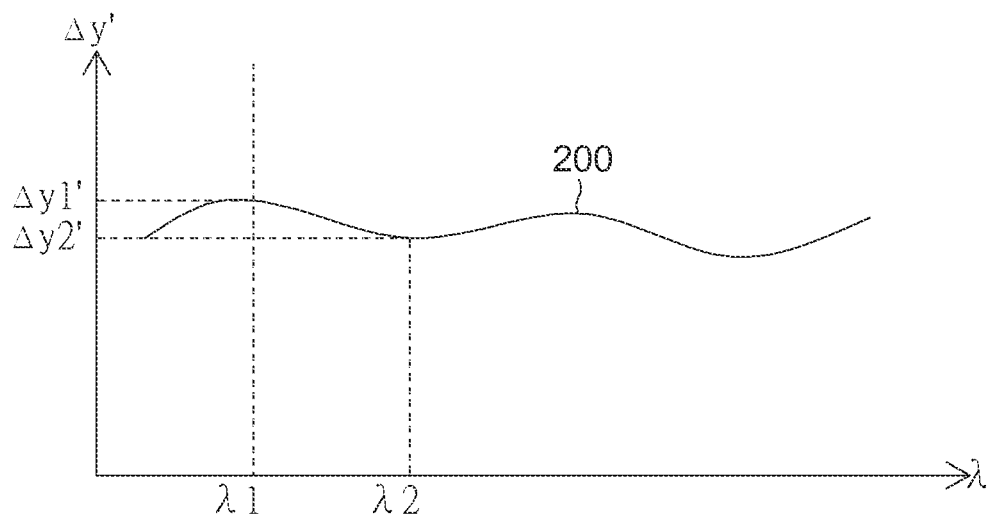
FIG. 6 shows an aberration characteristic curve of simulated local grating $R_k P_0$.
Figure 7:
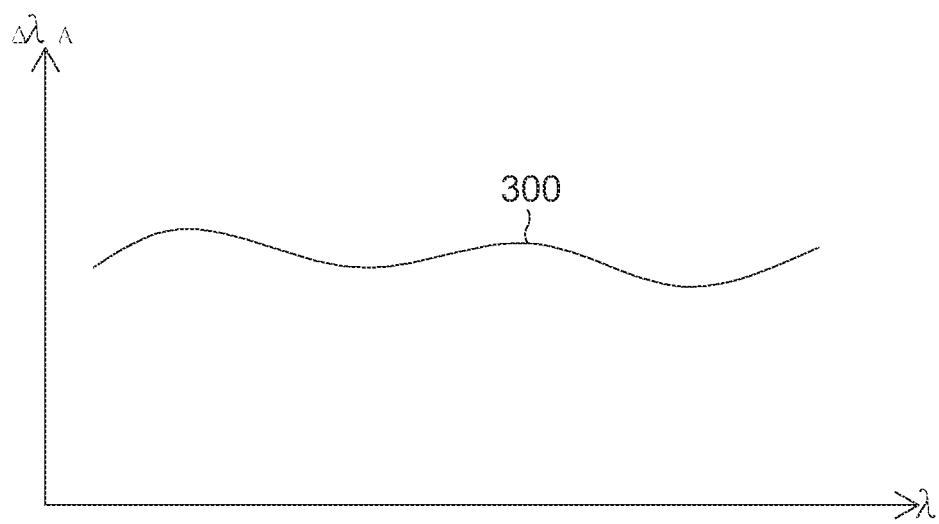
FIG. 7 shows an aberration induced spectral resolution characteristic curve of local grating $R_k P_0$.

Referring to FIGS. 5, 6 and 7. FIG. 5 shows a schematic diagram of aberration. FIG. 6 shows an aberration characteristic curve of a simulated local grating $R_kP_0$ formed by the line connecting reference point $R_k$ and central profile point $P_0$. FIG. 7 shows an aberration induced spectral resolution characteristic curve of local grating $R_kP_0$. The central profile point $P_0$ is the central point on the grating profile curved surface 142, and the reference point $R_k$ is the next profile point temporarily selected during the process of optical simulation and adjustment. After the light with a single wavelength emitted to a simulated local grating $R_kP_0$ whose pitch is defined by the line segment connecting $P_0$ and $R_k$ at a known incident angle α is diffracted, there will be an aberration formed between the focal position of the diffracted light and an ideal focal point on the predetermined focusing plane. After the light with various wavelengths emitted to a simulated local grating formed by different reference points and the central profile point $P_0$ at a known incident angle α is diffracted, respective simulated local gratings will result in different aberration characteristic curves, wherein the ideal focal point refers to the intersection position between the diffraction angle β and the predetermined focusing plane obtained according to the grating equation sin $$\alpha + \sin\beta = \frac{m\lambda}{d}$$

when a light with a single wavelength is emitted to the central profile point $P_0$ of a simulated grating whose pitch is an initial distance d0' at a known incident angle α. For example, suppose the wavelength of the light with a single wavelength A1 is λ1. Ideally, the light should be emitted to the position y1 on the predetermined output plane 162. However, according to the diffraction theory, after the light with a single wavelength A1 diffracted by a simulated local grating $R_kP_0$ is calculated and simulated according to the grating equation, and is then emitted to a position y2 on the predetermined output plane 162. The distance between the position y2 and the position y1 is referred as aberration Δy1'. Similarly, after the light with a single wavelength A1 being λ2 is diffracted by the simulated local grating RkP0, an aberration Δy2' will be generated accordingly. The aberration characteristic curve 200 for the local grating RkP0 of FIG. 6 is formed by connecting the aberration Δy' corresponding to the incoming light with wavelengths λ1~λn.

The aberration induced spectral resolution $$\Delta\lambda_A = \frac{\Delta y' d0 \cos\beta(\lambda)}{mr'}$$

can be obtained from the aberration Δy' according to the grating equation: sin $$\alpha + \sin\beta = \frac{m\lambda}{d}.$$

Wherein pitch d0 is the pitch for the local grating $R_kP_0$; the diffraction angle β, being the angle of the light A1 with a single wavelength diffracted by the local grating $R_kP_0$, is a function of λ; λ denotes the wavelength of the light A1; m denotes the diffraction order; distance r' denotes the distance of the light A1 diffracted from the local grating $R_kP_0$ to the predetermined output plane 162. According to the grating equation, each aberration Δy' has a corresponding aberration induced spectral resolution $\Delta\lambda_A$ provided that the pitch d0, the diffraction angle β, the wavelength λ, the diffraction order m and the distance r' are all given. In other words, the aberration characteristic curve 200 of FIG. 6 can be converted to the aberration induced spectral resolution characteristic curve 300 of FIG. 7 according to the grating equation.

The following steps are required for enabling the spectral components L1~Ln to be emitted to the predetermined output plane 162 in a direction substantially perpendicular to the predetermined output plane 162. Firstly, according to the diffraction theory as indicated in FIG. 3, a light with central wavelength is selected among the to-be-divided spectral components L1~Ln, an incident angle is determined, and an initial distance d0' is selected and used as the pitch of a grating with fixed pitch, then the diffraction angle β of the light with central wavelength is obtained by applying the above parameters to the grating equation, wherein the selection of the initial distance d0' is disclosed below. After the diffraction angle β of the light with central wavelength is obtained, the predetermined output plane can be fixed at an angle perpendicular to the diffracted light with central wavelength. Then, the design criteria of the grating can be loosed for allowing the pitch to be non-fixed, and allowing the grating profile curved surface to change, so that all positions of the profile points on the grating profile curved surface 142 of the reflection type diffraction grating 14 can be located by way of optical simulation, and a preferred aberration induced spectral resolution smaller than a predetermined value can be obtained after the incident light with various wavelengths is diffracted. The determination of the positions of the profile points on the grating profile curved surface 142 of the reflection type diffraction grating 14 can start with the datum point of the central profile point $P_0$, and then the position at which the aberration induced spectral resolution $\Delta\lambda_A$ smaller than a predetermined value is located through repeated adjustment of pitches and local grating profile by way of optical simulation and is used as the position of a preferred next profile point $P_1$. Then, the profile point $P_1$ is used as a datum point, and the determination of the positions of the profile points on the grating profile curved surface 142 of the reflection type diffraction grating 14 starts again. Likewise, the position at which the aberration induced spectral resolution $\Delta\lambda_A$ smaller than a predetermined value is located through repeated adjustment of pitches and local grating profile by way of optical simulation and is used as the position of another preferred next profile point $P_2$. The process is repeated until the grating profile curved surface 142 of the reflection type diffraction grating 14 is covered with local grating profile points at different pitches. The reflection type diffraction grating 14 obtained according to the above process will be the best grating obtained by way of optical simulation, and there is an aberration induced spectral resolution smaller than a predetermined value existing between the reflection type diffraction grating 14 and an ideal grating substantially perpendicular to the predetermined output plane 162.

The repeated adjustment of pitches and local grating profile is disclosed below. Firstly, the meaning of the profile point temporarily selected during the process of optical simulation and adjustment is explained, that is, the meaning of the reference point $R_{ij}$ is defined. Wherein the designation i denotes the i-th adjustment, the designation j denotes the j-th reference point, and the designation $R_{ij}$ denotes the j-th reference point selected among a plurality of reference points at the i-th process of adjustment.

Figure 8:
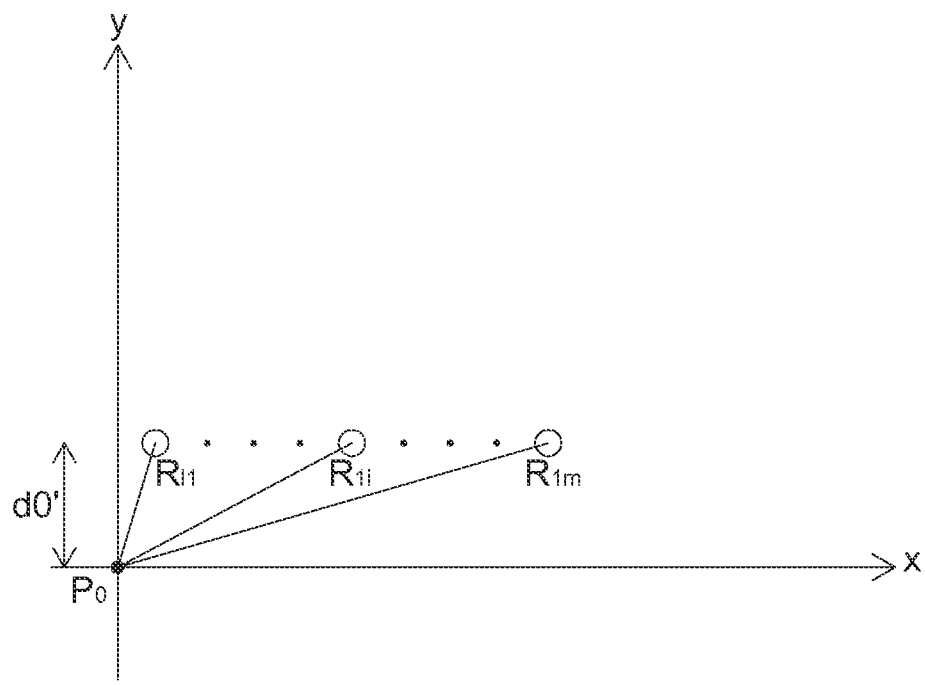
FIG. 8 shows a schematic diagram of central profile point $P_0$ and reference points $R_{11}$~$R_{1m}$.
Figure 9:
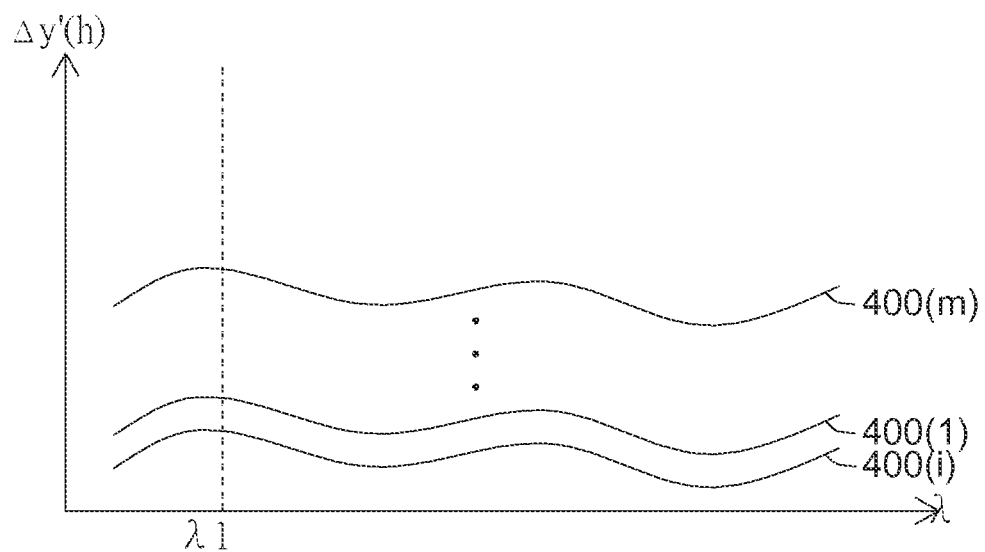
FIG. 9 shows the aberration characteristic curves of local gratings $R_{11}P_0$~$R_{1m}P_0$ formed by the lines connecting reference points $R_{11}$~$R_{1m}$ and central profile point $P_0$.
Figure 10:
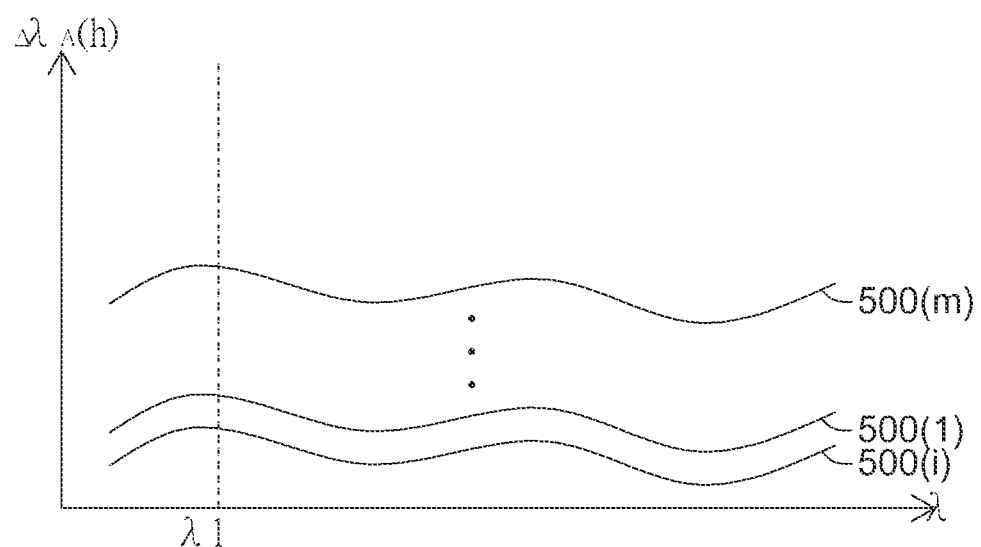
FIG. 10 shows an aberration induced spectral resolution characteristic curve of local gratings $R_{11}P_0$~$R_{1m}P_0$.

Referring to FIG. 8, FIG. 9 and FIG. 10. FIG. 8 shows a schematic diagram of central profile point $P_0$ and reference points $R_{11}$~$R_{1m}$. FIG. 9 shows the aberration characteristic curves of local gratings $R_{11}P_0$~$R_{1m}P_0$ formed by the lines connecting reference points $R_{11}$~$R_{1m}$ and central profile point $P_0$. FIG. 10 shows an aberration resolution characteristic curve of local gratings $R_{11}P_0$~$R_{1m}P_0$. The central profile point $P_0$ on the grating profile curved surface 142 is the central point on the grating profile curved surface 142. In order to determine the next profile point $P_1$ on the grating profile curved surface 142, normally the determination starts with a reference point which is away from the central profile point $P_0$ by an initial distance d0' in a vertical direction.

It is noted that the initial distance d0' is normally determined according to a process limit, and the order of the initial distance d0' selected during the location of the profile point $P_1$ will determine the order of the pitch of each grating structure 144. If the initial distance d0' is the order of about several micrometers, then the pitch of each grating structure 144 determined by way of optical simulation is also the order of about several micrometers, not tens of micrometers. However, the initial distance d0' is a parameter relates to the total spectral resolution of an optical system. In theory, smaller initial distance d0' can achieve preferred total spectral resolution, but in practice, whether such tiny grating can be achieved in the manufacturing process is still a problem. Thus, the simulation needs to agree with the process limit, and the initial distance d0' with minimum order that can be achieved is selected and used as a first distance for locating the profile point $P_1$. In terms of the current technology available for the etching process of semiconductor, the process limit for manufacturing the diffraction grating made from semiconductor base material is about several micrometers. Thus, it is feasible to select the initial distance d0' with several micrometers. When it comes to sub-micrometer level, the total spectral resolution has better performance but is hard to control according to the current technology available for etching semiconductor.

Thus, during the process of optical simulation, the position, which is away from the central profile points $P_0$ by an initial distance d0' in a vertical direction, is selected as a starting datum point, and m reference points $R_{11}$~$R_{1m}$ are selected in a horizontal direction passing through the datum point and parallel to the x-axis. The selection of the reference points $R_{11}$~$R_{1m}$ can be m points starting from the datum point and mutually separated by a fixed distance. During the subsequent process of simulation, the reference points for the current simulation can be selected in the same manner, but the fixed distance is gradually reduced in each simulation in response to the eventual result of convergence or is appropriately adjusted. The lengths of the m segments formed by the reference points $R_{11}$~$R_{1m}$ and the central profile points $P_0$ respectively denote the pitch of one of the simulated local gratings $R_{11}P_0$~$R_{1m}P_0$ during the process of optical simulation. According to the grating equation, the m simulated local gratings $R_{11}P_0$~$R_{1m}P_0$ respectively result in m different aberrations, and the m aberration characteristic curves 400(1)~400(m) of FIG. 9 are formed by recording the values of the aberration caused by the light with different wavelengths. The aberration characteristic curves 400(1)~400(m) corresponding to the local gratings $R_{11}P_0$—$R_{1m}P_0$ can be converted to the aberration induced spectral resolution characteristic curves 500(1)~500(m) of FIG. 10 according to the grating equation.

To achieve preferred focusing effect, a preferred aberration induced spectral resolution characteristic curve 500(i) is selected from the aberration induced spectral resolution characteristic curves 500(1)~500(m), and the reference point $R_{1i}$ forming the aberration induced spectral resolution characteristic curve 500(i) is used as a local preferred reference point. The preferred aberration induced spectral resolution can be defined according to the sum of the aberration induced spectral resolution of various wavelengths, simply selected from the characteristic curves smaller than a predetermined value, or selected according to a predetermined criterion. After $R_{1i}$ is selected as the local preferred reference point for the first simulation, $R_{1i}$ can then be used as a datum point for performing the second optical simulation and adjustment, n reference points $R_{21}$~$R_{2n}$ are selected in a vertical direction passing through the reference point $R_{1i}$. Another local preferred reference point $R_{2j}$ with preferred aberration induced spectral resolution is selected in the same manner, and then $R_{2j}$ is used as a datum point for performing the third optical simulation and adjustment. By the same token, the position of the reference point continue to change in the horizontal and the vertical direction, and an updated local preferred reference point with preferred aberration induced spectral resolution is repeatedly selected until convergence is achieved.

Figure 11:
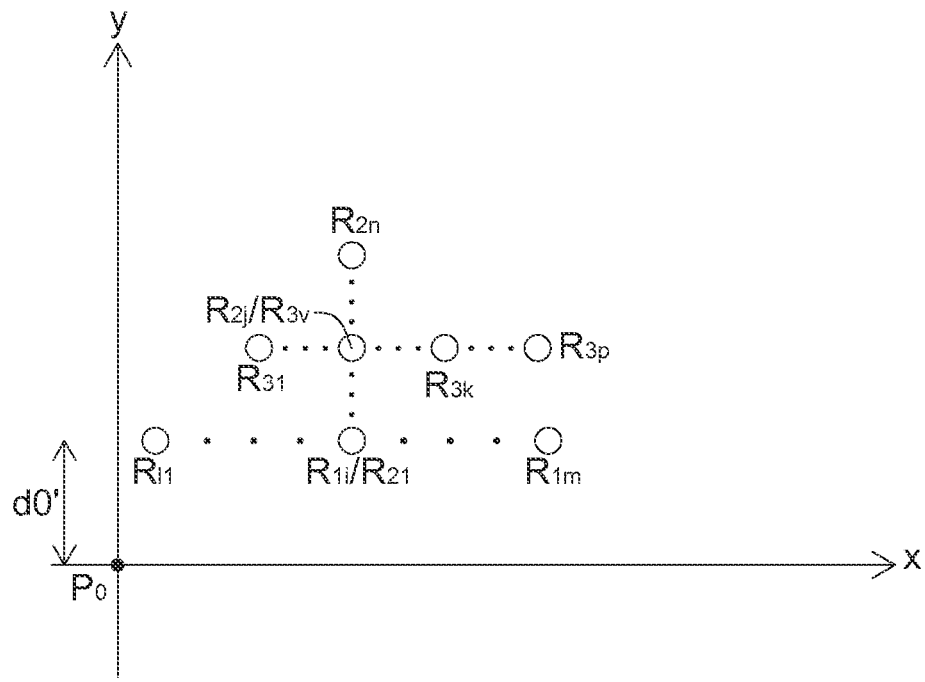
FIG. 11 shows a schematic diagram of central profile point $P_0$, reference points $R_{11}$~$R_{1m}$, reference points $R_{21}$~$R_{2n}$ and reference points $R_{31}$~$R_{3p}$.
Figure 12:
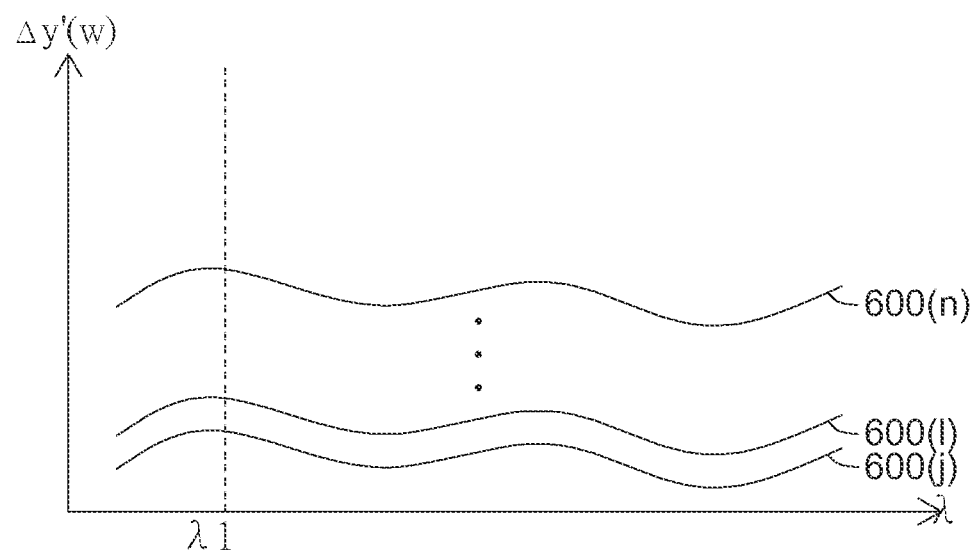
FIG. 12 shows an aberration characteristic curve of n simulated local gratings $R_{21}P_0$~$R_{2n}P_0$ formed by the lines connecting reference points $R_{21}$~$R_{2n}$ and central profile point $P_0$.
Figure 13:
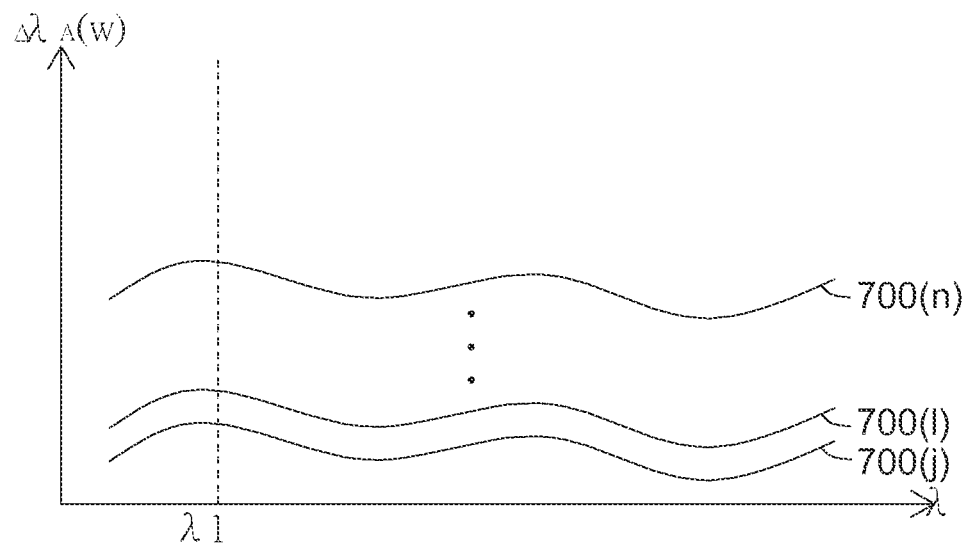
FIG. 13 shows an aberration induced spectral resolution characteristic curve of n simulated local gratings $R_{21}P_0$~$R_{2n}P_0$.

Referring to FIG. 11, FIG. 12 and FIG. 13 at the same time. FIG. 11 shows a schematic diagram of central profile point $P_0$, reference points $R_{11}$~$R_{1m}$, reference points $R_{21}$~$R_{2n}$ and reference points $R_{31}$~$R_{3p}$. FIG. 12 shows an aberration characteristic curve of n simulated local gratings $R_{21}P_0$~$R_{2n}P_0$ formed by the lines connecting reference points $R_{21}$~$R_{2n}$ and central profile point $P_0$. FIG. 13 shows aberration resolution characteristic curve of n simulated local gratings $R_{21}P_0$~$R_{2n}P_0$. After the local preferred reference point $R_{1i}$ is located, the reference point $R_{1i}$ is used as a datum point for performing second optical simulation and adjustment, and n reference points $R_{21}$~$R_{2n}$ are selected in a vertical direction passing through the reference point $R_{1i}$. Since the reference point $R_{1i}$ itself could be a reference point among the reference points $R_{21}$~$R_{2n}$, for convenience of elaboration, in FIG. 11, the reference point $R_{1i}$ is also the reference point $R_{21}$.

Similarly, the aberration $\Delta y'$ (w) formed by n simulated local gratings $R_{21}P_0$~$R_{2n}P_0$ is illustrated in FIG. 11, and the aberration characteristic curves 600(1)~600(n) corresponding to the n simulated local gratings $R_{21}P_0$~$R_{2n}P_0$ can be converted to the aberration induced spectral resolution characteristic curves 700(1)~700(n) of FIG. 12 according to the grating equation. To achieve preferred focusing effect, the characteristic curve 700(j) with preferred aberration induced spectral resolution can be selected from the aberration induced spectral resolution characteristic curves 700(1)~700(n), and the reference point $R_{2j}$ forming the aberration induced spectral resolution characteristic curve 700(j) is selected and used as a local preferred reference point.

Next, the reference point $R_{2j}$ is used as a datum point for performing the third optical simulation and adjustment, and p reference points $R_{31}$~$R_{3p}$ are selected in a horizontal direction passing through the reference point $R_{2j}$. Since the reference points $R_{2j}$ itself could be a reference point of the reference points $R_{31}$~$R_{3p}$, for convenience of elaboration, in FIG. 11, the reference point $R_{2j}$ is also the reference point $R_{3v}$. Similarly, p aberration characteristic curves can be correspondingly obtained according to the p simulated local gratings $R_{31}P_0$~$R_{3p}P_0$ formed by the lines connecting the reference points $R_{31}$~$R_{3p}$ and the central profile point $P_0$, and these aberration characteristic curves can be converted to p aberration induced spectral resolution characteristic curves according to the grating equation. To achieve preferred focusing effect, a characteristic curve with preferred aberration induced spectral resolution can be selected from the aberration induced spectral resolution characteristic curves, and the reference point $R_{3k}$ forming the aberration induced spectral resolution characteristic curve is selected and used as a local preferred reference point.

Figure 14:
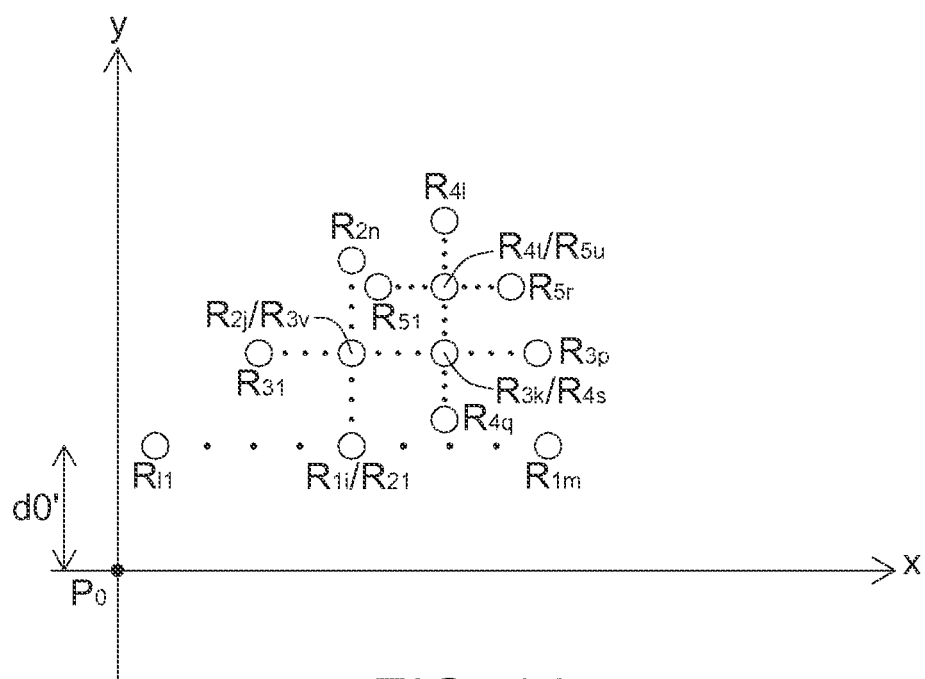
FIG. 14 shows a schematic diagram of central profile point $P_0$, reference points $R_{11}$~$R_{1m}$, reference points $R_{21}$~$R_{2n}$, reference points $R_{31}$~$R_{3p}$, reference points $R_{41}$~$R_{4q}$ and reference points $R_{51}$~$R_{5r}$.
Figure 15:
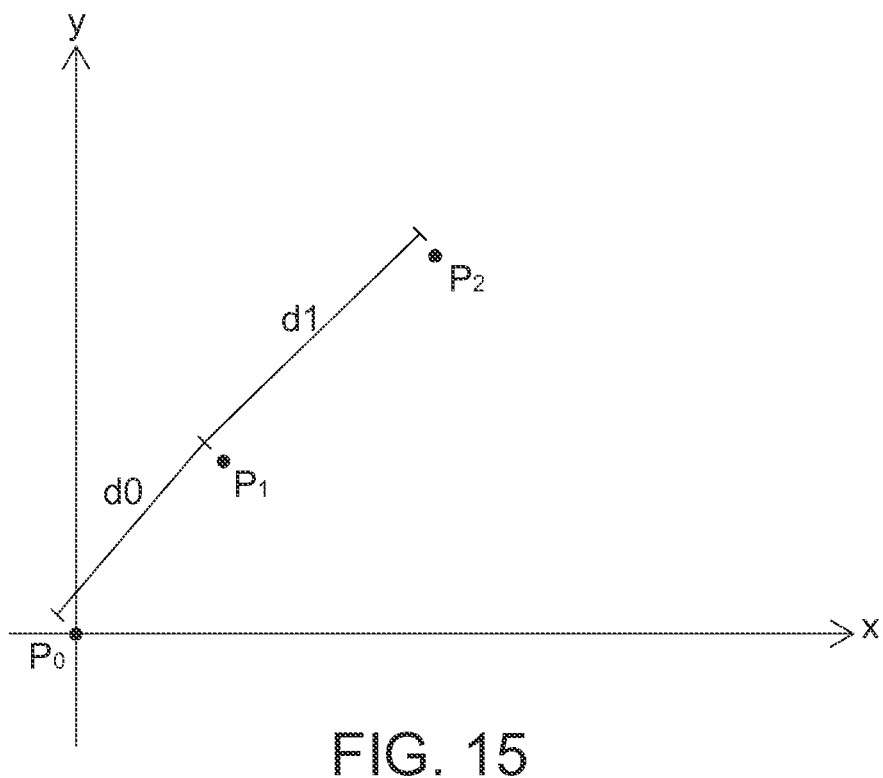
FIG. 15 shows a schematic diagram of central profile point $P_0$, profile points $P_1$ and profile points $P_2$.
Figure 16:
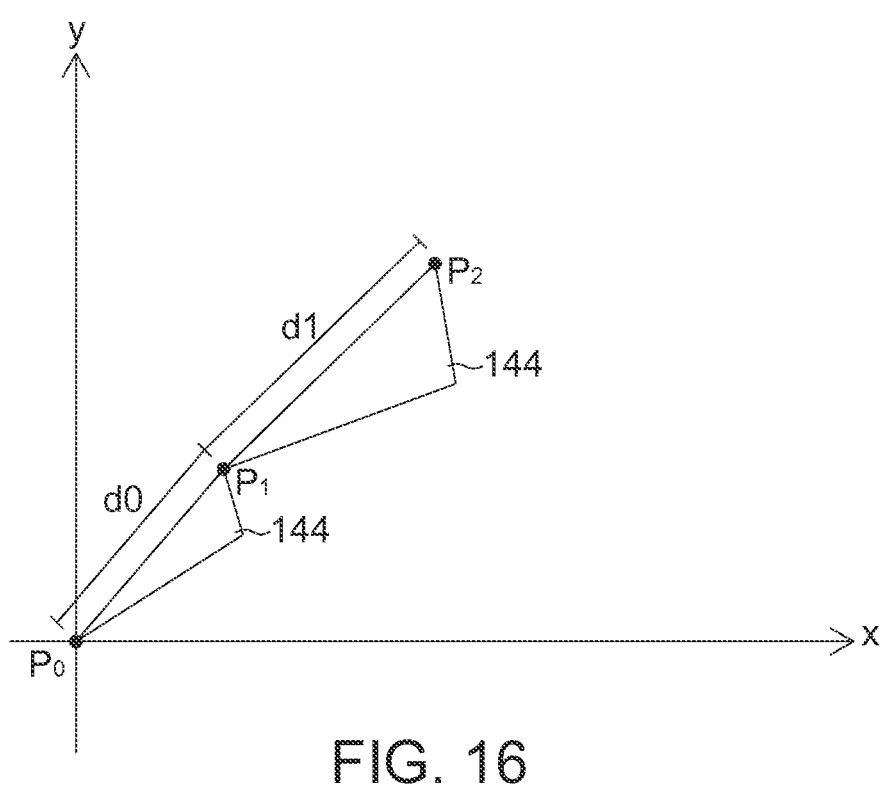
FIG. 16 shows a schematic diagram of central profile points $P_0$, profile points $P_1$, profile point $P_2$ and diffraction structures.

Referring to FIG. 14, FIG. 15 and FIG. 16 at the same time. FIG. 14 shows a schematic diagram of central profile point $P_0$, reference points $R_{11}$~$R_{1m}$, reference points $R_{21}$~$R_{2n}$, reference points $R_{31}$~$R_{3p}$, reference points $R_{41}$~$R_{4q}$ and reference points $R_{51}$~$R_{5r}$. FIG. 15 shows a schematic diagram of central profile point $P_0$, profile points $P_1$ and profile points $P_2$. FIG. 16 shows a schematic diagram of central profile point $P_0$, profile point $P_1$, profile point $P_2$ and diffraction structures.

After the local preferred reference points $R_{3k}$ is located, the reference points $R_{3k}$ is used as a datum point for performing the fourth optical simulation and adjustment, and q reference points $R_{41}$~$R_{4q}$ are selected in a vertical direction passing through the reference points $R_{3k}$. Since the reference points $R_{3k}$ itself could also be a reference point of the reference points $R_{41}$~$R_{4q}$, for convenience of elaboration, in FIG. 14, the reference point $R_{3k}$ is also a reference point $R_{4s}$. Similarly, q aberration characteristic curves can be correspondingly obtained according to the q simulated local gratings $R_{41}P_0$~$R_{4q}P_0$ formed by the line connecting the reference points $R_{41}$~$R_{4q}$ and the central profile point $P_0$, and these aberration characteristic curves can be converted to q aberration induced spectral resolution characteristic curves according to the grating equation. To achieve preferred focusing effect, a characteristic curve with preferred aberration induced spectral resolution can be selected from the aberration induced spectral resolution characteristic curves, and the reference point $R_{4t}$ forming the aberration induced spectral resolution characteristic curve is selected and used as a local preferred reference point.

Then, the reference point $R_{4t}$ is used as a datum point for performing the fifth optical simulation and adjustment, and r reference points $R_{51}$~$R_{5r}$ are selected in a horizontal direction passing through the reference point $R_{4t}$. Since the reference points $R_{4t}$ itself could be a reference point of the reference points $R_{51}$~$R_{5r}$, for convenience of elaboration, in FIG. 14, the reference point $R_{4t}$ is also a reference point $R_{5u}$. Similarly, r aberration characteristic curves can be correspondingly obtained according to the r simulated local gratings $R_{51}P_0$~$R_{5r}P_0$ formed by the line connecting reference points $R_{51}$~$R_{5r}$ and the central profile points $P_0$, and these aberration characteristic curves can be converted to r aberration induced spectral resolution characteristic curves according to the grating equation. To achieve preferred focusing effect, a characteristic curve with preferred aberration induced spectral resolution can be selected from the aberration induced spectral resolution characteristic curves, and the reference point $R_{5r}$ forming the aberration induced spectral resolution characteristic curve is selected and used as a local preferred reference point.

After the above steps are repeatedly performed, the adjustable distances of the reference points in the horizontal and the vertical directions will become smaller and smaller and gradually converge. When the adjustable distances of the reference points in the horizontal and the vertical directions gradually decreases to a predetermined value, the reference point is used as a profile point $P_1$ on the grating profile curved surface 142, and $P_1$ is used as a starting point for locating $P_2$. Then, a preferred next profile point $P_2$ is located according to the above reference point through repeated simulation and adjustment. Other profile points on the grating profile curved surface 142 can also be determined in the same manner. After all profile points on the grating profile curved surface 142 are determined, the diffraction structure 144 can be formed by distributing similar triangles, squares or other suitable structures on the segments formed by every two profile points, and the lines connecting the profile points are the grating profile curved surface itself. Thus, the reflection type diffraction grating 14 is implemented.

According to the results of actual simulation, the position of the profile point $P_1$ finally determined is actually very close or even equal to the position away from the central profile points $P_1$ by an initial distance d0' in a vertical direction. Since the ideal focal point y1 of FIG. 5 is obtained by applying a simulated grating whose pitch is equal to the initial distance d0' to the grating equation, when the above position away from the central profile point $P_1$ by an initial distance d0' in a vertical direction is used as a starting point for simulation, the particular point is almost the point of convergence with minimum aberration. However, when the profile points are obtained towards the peripheral on the grating profile curved surface, the aberration value becomes larger, and the point of final convergence will be farther away from the previous profile point. Let the semiconductor etching process in which the grating structure is etched on a silicon base be taken for example. If the initial distance d0' is 2.5 micrometers, then the distance between the central profile points $P_0$ and $P_1$ is about 2.5 micrometers, but the pitch of the outmost grating structure could be as large as 3~4 micrometers or even larger.

Since the reflection type diffraction grating of the invention has a non-planar grating profile curved surface and a plurality of pitches being different from each other, the conventional method of etching the diffraction structure on a flat metal or a glass surface by a diamond knife is no longer applicable. This is because it is difficult for the diamond knife to change the pitch of the etching process or to operate on the surface of a non-flat substance. Thus, the reflection type diffraction grating of the invention is preferably made from a semiconductor base material (such as silicon or III-V semiconductor material). The preferable etching method for the reflection type diffraction grating of the invention is as follows: forming the grating profile curved surface and the grating structure by downwardly etching the wafer surface, and further separating the reflection type diffraction grating from the wafer.

Figure 17:
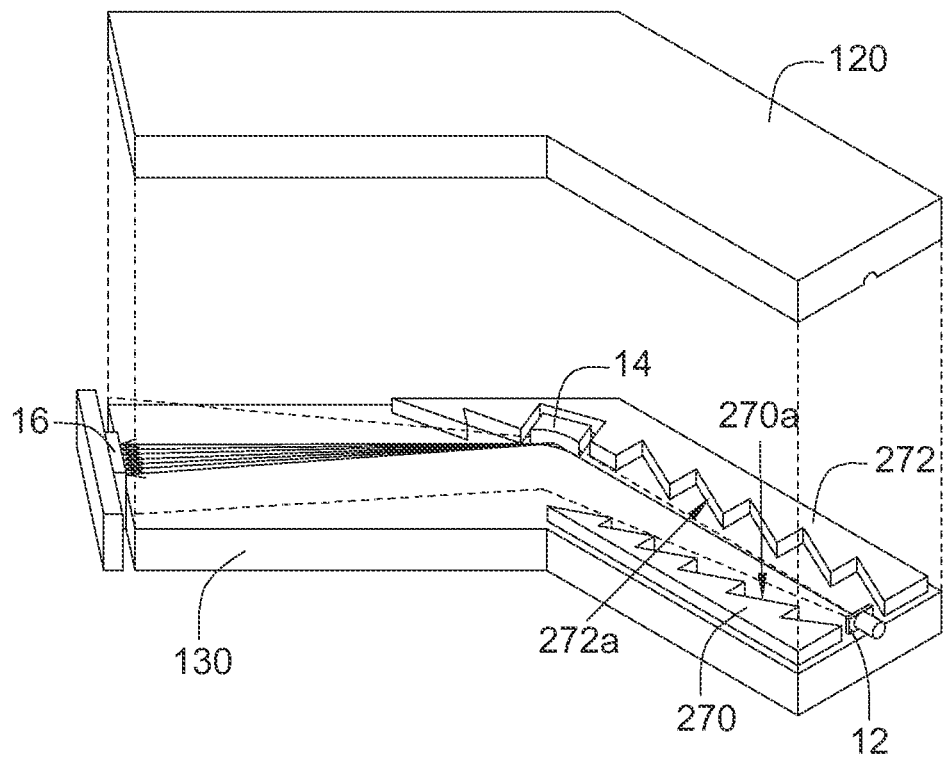
FIG. 17 shows a decomposition diagram of an optical system according to an embodiment of the invention.
Figure 18:
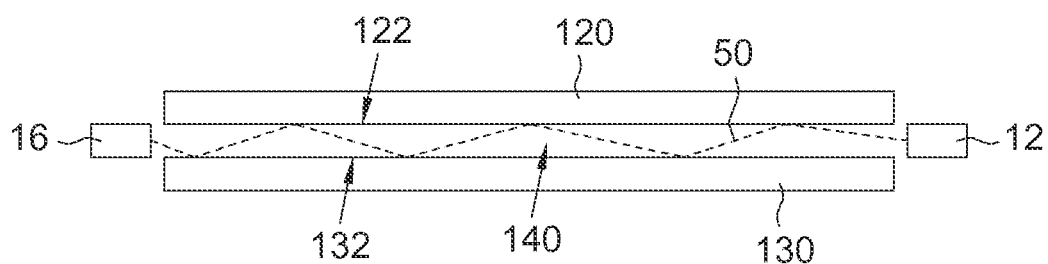
FIG. 18 shows a light proceeding in a light channel of the optical system of FIG. 17.
Figure 19:
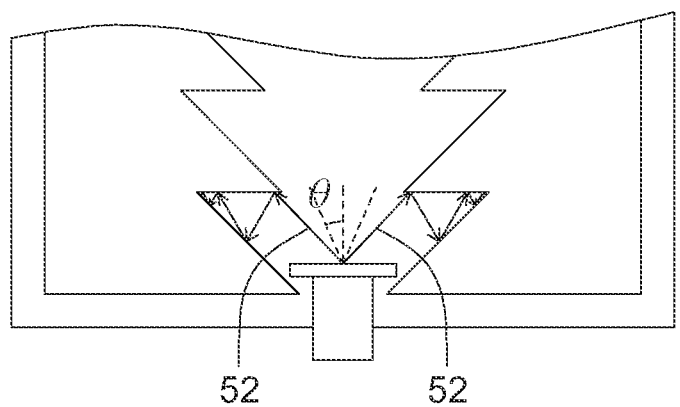
FIG. 19 shows an extinction mechanism of an extinction component of FIG. 17.

Referring to FIG. 17, FIG. 18 and FIG. 19 at the same time. FIG. 17 shows a decomposition diagram of an optical system according to an embodiment of the invention. FIG. 18 shows a light proceeding in a light channel of the optical system of FIG. 17. FIG. 19 shows an extinction mechanism of an extinction component of FIG. 17. The optical system 10 further comprises an upper wave-guiding plate 120, a lower wave-guiding plate 130, a first extinction component 270 and a second extinction component 272.

The lower wave-guiding plate 130 is substantially parallel to the upper wave-guiding plate 120. The upper wave-guiding plate 120 has a first reflection surface 122, and the lower wave-guiding plate 130 has a second reflection surface 132 opposite to the first reflection surface 122. A light channel 140 is formed between the first reflection surface 122 and the second reflection surface 132, and the optical signal 50 outputted from the input member 12 proceeds in the light channel 140 as indicated in FIG. 18. The light channel 140 formed between the first reflection surface 122 and the second reflection surface 132 is normally cavity-type. Unlike the principle of total reflection of the light adopted in the transmission of signal in optical fiber, in the invention, the optical signal is repeatedly reflected between the reflection surfaces. When the reflection surfaces are filled with a suitable substance, such as glass, plastics and acrylics, the optical signal can be reflected between the reflection surfaces and then transmitted forward, so that dusts or other pollutants will not alight on the lower wave-guiding plate and the flatness and reflectivity of the wave-guide plate will not deteriorate.

The upper wave-guiding plate 120 and the lower wave-guiding plate 130 must have excellent flatness and reflectivity, so that the loss of signal is minimized and the concentration of the light source is maximized when the optical signal 50 proceeds between the upper wave-guiding plate 120 and the lower wave-guiding plate 130. Thus, the upper wave-guiding plate 120 and the lower wave-guiding plate 130 are preferably made from material such as stainless steel, silicon chip, glass, optical disc or hard disc. If the reflectivity of the material used for forming the upper wave-guiding plate 120 and the lower wave-guiding plate 130 is below a standard level, a high reflective film can be disposed on the first reflection surface 122 and the second reflection surface 132 to resolve such problem. Preferably, the high reflective film is an aluminum film.

To avoid the flatness and the reflectivity on the surfaces of the first reflection surface 122 and the second reflection surface 132 being deteriorated due to oxidization, rustication or coarsening, a first protection film and a second protection film can be respectively disposed on the high reflective films of the first reflection surface 122 and the second reflection surface 132, wherein the protection film is preferably made from silicon dioxide.

Figure 1:
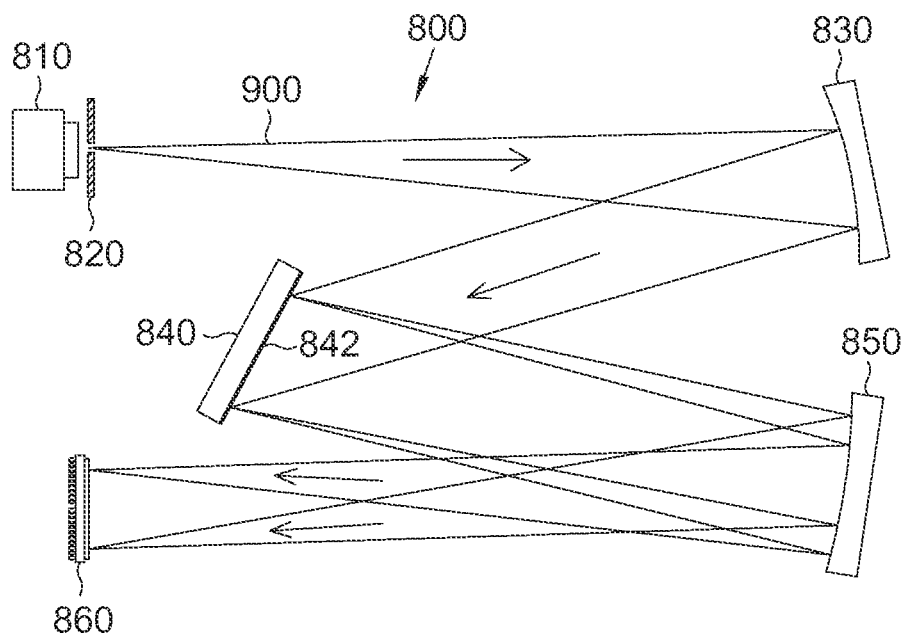
FIG. 1 shows a schematic diagram of a conventional spectrum analyzer.

The conventional spectrum analyzer 800 of FIG. 1 transmits the light in the internal cavity. If the light is diverged, the light signal will be too weak and interfered with by the stray light. Further, the volume of the conventional spectrum analyzer 800 is too large. By enabling the optical signal 50 to proceed in the light channel 140, the light of the optical system 10 will be more centralized and will not diverge, further increasing the efficiency of the optical system. The optical system 10 of the present embodiment of the invention can further be equipped with a first extinction component 270 and a second extinction component 272, and is less affected by the stray light and makes the optical detector 16 generating more accurate images. After the images are transmitted to the next stage circuit, the accuracy in subsequent process of determining the physical and biochemical features denoted by the optical signal according to the intensities of the light with different wavelengths can be further increased.

The lateral sides of the cross-sections of the first extinction component 270 and the second extinction component 272 are saw-toothed and towards the light channel 140. For example, the side 270a of the first extinction component 270 and the side 272a of the second extinction component 272 is towards the light channel 140. The first extinction component 270 and the second extinction component 272 are respectively disposed on two sides of the light channel 140 for absorbing the optical signal emitted by the input member 12 at an angle larger than a particular angle. For example, the particular angle is such as angle θ, which is related to the saw-toothed structures of the first extinction component 270 and the second extinction component 272. Suppose the deviation optical signal 52 proceeds at an angle larger than the angle θ. When the deviation optical signal 52 proceeds at an angle larger than the angle θ, the deviation optical signal 52 will be emitted to one of the triangular indentations of the saw-toothed structure. The saw-toothed structure of the extinction component enables the deviation optical signal 52 of FIG. 19 to be reflected back and forth in the indentation of the saw-toothed structure and become weakened accordingly. Thus, the deviation optical signal 52, which would otherwise cause stray optical signals, will be eliminated by the saw-toothed structure, and make the desired spectral components brighter and clearer.

According to the micro-spectrometer optical mechanism disclosed in the above embodiments of the invention, the optical signal, which enters via the input member, proceeds in the light channel formed between the upper and the lower wave-guiding plate, so that the optical signal will be more concentrated and not easily diverged. With the saw-toothed extinction component, the optical signal whose incident angle is too large is eliminated, so that less stray light will reach the image capturing component, the desired spectral component will not be interfered by the stray light, and the obtained images will be clearer.

The optical system disclosed in above embodiments of the invention has many advantages exemplified below:

Firstly, the number of components used in the optical system is reduced.

Secondly, the spectral components can be substantially perpendicular to a predetermined output plane to obtain preferred optical detection quality.

Thirdly, the optical signal can be concentrated and transmitted in a wave-guide plate, the stray light can further be filtered, and a perfect optical system can thus be achieved if the above grating in which the spectral components being perpendicular to a predetermined output plane is adopted.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A spectrum analyzer, comprising:
    an input member for receiving an optical signal;
    a predetermined output plane; and
    a reflection type diffraction grating, comprising:
        a grating profile curved surface which is a non-Rowland circle curved surface; and
        a plurality of diffraction structures for separating the optical signal into a plurality of spectral components, each of the diffraction structures having a pitch and formed on the grating profile curved surface, wherein at least two pitches are different, and one of the spectral components indicating a central wavelength is emitted to the predetermined output plane in a direction substantially perpendicular to the predetermined output plane;
    an upper wave-guiding plate with a first reflection surface; and
    a lower wave-guiding plate substantially parallel to the upper wave-guiding plate, wherein the lower wave-guiding plate has a second reflection surface opposite to the first reflection surface, a light channel is formed between the first reflection surface and the second reflection surface, and the optical signal outputted from the input member proceeds in the light channel.

2. The spectrum analyzer according to claim 1, wherein the plurality of spectral components comprises more than 3 spectral components.

3. The spectrum analyzer according to claim 1, wherein the predetermined output plane is a straight line on a plane.

4. The spectrum analyzer according to claim 1, wherein the predetermined output plane is an optical image reception plane of a charge couple device (CCD).

5. The spectrum analyzer according to claim 1, wherein the predetermined output plane is an optical image reception plane of a complementary metal-oxide-semiconductor (CMOS).

6. The spectrum analyzer according to claim 1, wherein the grating profile curved surface and the diffraction structures of the reflection type diffraction grating are etched on a semiconductor base material.

7. The spectrum analyzer according to claim 6, wherein the semiconductor base is made from silicon.

8. The spectrum analyzer according to claim 1, wherein the upper wave-guiding plate and the lower wave-guiding plate are made from stainless steel, silicon chip, glass, optical disc or hard disc.

9. The spectrum analyzer according to claim 1, wherein the light channel is cavity-type.

10. The spectrum analyzer according to claim 9, wherein the light channel is further filled with glass, plastics or acrylics.

11. The spectrum analyzer according to claim 1, further comprising a first extinction component and a second extinction component respectively disposed at two sides of the light channel, wherein one side of a cross-section of the first extinction component is saw-toothed, wherein one side of a cross-section of the second extinction component is saw-toothed, and wherein both the saw-toothed sides face the light channel and are configured to receive the optical signal outputted at an angle larger than a particular angle.

* * * * *